(12) United States Patent
Carosielli et al.

(10) Patent No.: US 12,151,381 B2
(45) Date of Patent: Nov. 26, 2024

(54) METALLURGIC CASTING INSTALLATION

(71) Applicant: Vesuvius Group, S.A., Ghlin (BE)

(72) Inventors: David Carosielli, Chapelle-lez-Herlaimont (BE); Mariano Collura, Strepy-Bracquegnies (BE); Damien Delsine, Saint-Ghislain (BE)

(73) Assignee: Vesuvius Group, S.A., Ghlin (BE)

( * ) Notice: Subject to any disclaimer, the term of this patent is extended or adjusted under 35 U.S.C. 154(b) by 785 days.

(21) Appl. No.: 17/312,521

(22) PCT Filed: Dec. 17, 2019

(86) PCT No.: PCT/EP2019/085621
§ 371 (c)(1),
(2) Date: Jun. 10, 2021

(87) PCT Pub. No.: WO2020/127244
PCT Pub. Date: Jun. 25, 2020

(65) Prior Publication Data
US 2022/0048193 A1    Feb. 17, 2022

(30) Foreign Application Priority Data
Dec. 18, 2018    (EP) ..................................... 18213318

(51) Int. Cl.
*B25J 17/02*    (2006.01)
*B22D 41/30*    (2006.01)
(Continued)

(52) U.S. Cl.
CPC ............ *B25J 9/1679* (2013.01); *B22D 41/30* (2013.01); *B22D 45/00* (2013.01); *B25J 9/1664* (2013.01);
(Continued)

(58) Field of Classification Search
CPC .... B25J 9/142; B25J 17/0208; B25J 17/0225; B25J 17/0233; Y10S 901/45
See application file for complete search history.

(56) References Cited

U.S. PATENT DOCUMENTS 4,540,331 A * 9/1985 Stanner .................. B25J 19/063
414/730
4,872,718 A * 10/1989 Nerger ................. B25J 17/0208
414/730

(Continued)

FOREIGN PATENT DOCUMENTS

CN 102186638 A 9/2011
CN 103429400 A 12/2013
(Continued)

*Primary Examiner* — Dean J Kramer
(74) *Attorney, Agent, or Firm* — MaxGoLaw PLLC (57) ABSTRACT

A metallurgic casting installation comprises a robot. The robot comprises a handling tool coupled to an arm of the robot by a coupling element. The coupling element comprises a tool interface rigidly coupled to the handling tool, and a robot interface rigidly coupled to the arm of the robot. The compliance of the coupling element can be controlled such that upon application of a load onto the tool interface, the tool interface can be moved relative to the robot interface, by translation along and/or rotation about one or more of a first, second and third orthogonal spatial axes X1, X2, X3. The coupling element is resilient in that upon release of the load, the tool interface returns to a reset position relative to the robot interface corresponding to a reset distance Dr separating the tool interface and the robot interface.

11 Claims, 5 Drawing Sheets

(51) Int. Cl.
  *B22D 45/00* (2006.01)
  *B25J 9/16* (2006.01)
  *B25J 11/00* (2006.01)
  *B25J 15/08* (2006.01)

(52) U.S. Cl.
  CPC ............ *B25J 11/005* (2013.01); *B25J 15/08* (2013.01); *B25J 17/0208* (2013.01)

(56) References Cited

U.S. PATENT DOCUMENTS

| | | | |
|---|---|---|---|
| 4,952,117 A * | 8/1990 | Nerger | B25J 17/0208 |
| | | | 901/45 |
| 5,148,610 A | 9/1992 | Cusack | |
| 5,271,686 A | 12/1993 | Herring, Jr. et al. | |
| 5,388,733 A | 2/1995 | Richard | |
| 8,070,201 B2 * | 12/2011 | Trygg | B25J 15/04 |
| | | | 901/49 |
| 9,709,119 B2 | 7/2017 | Kendrick | |
| 2004/0128850 A1 | 7/2004 | Joo | |
| 2014/0005831 A1 | 1/2014 | Naderer et al. | |
| 2017/0045106 A1 | 2/2017 | Kendrick | |

FOREIGN PATENT DOCUMENTS

| | | |
|---|---|---|
| CN | 105234807 A | 1/2016 |
| DE | 10 2009 050216 A1 | 12/2010 |
| DE | 10 2016 200838 A1 | 2/2017 |
| EP | 0621087 A1 | 10/1994 |
| EP | 0621097 A1 | 10/1994 |
| EP | 2500150 A2 | 9/2012 |
| GB | 2198111 A | 6/1988 |
| JP | H07308883 A | 11/1995 |
| JP | 2002254258 A | 9/2002 |
| JP | 2014508051 A | 4/2014 |

* cited by examiner

METALLURGIC CASTING INSTALLATION

CROSS REFERENCE TO RELATED APPLICATIONS

This application is a U.S. national stage application, filed under 35 U.S.C. § 371, of International Application No. PCT/EP2019/085621, which was filed on Dec. 17, 2019, and which claims priority from European Patent Application No. EP 18213318.1, which was filed on Dec. 18, 2018, the contents of each of which are incorporated by reference into this specification.

BACKGROUND OF THE INVENTION

(1) Field of the Invention

The present invention relates to a metallurgic casting installation. The metallurgic casting installation comprises a robot and a handling tool coupled to an arm of the robot by a coupling element.

(2) Description of the Related Art

An increasing number of tasks in the metallurgic industry are performed by robots. Some tasks are however still performed by human operators because they require an accuracy and a dexterity beyond the capabilities of the current metallurgic robots. This is however hard labour. Handling heavy weights under time pressure, at high temperatures and requiring strength can be harmful for the health of the human workers. Furthermore, human errors can be made under such stressful conditions. In other industries than the metallurgic industry, compliant coupling elements coupling the arm of a robot to a handling tool have been used. When the position of the end of arm tool must be finetuned beyond the accuracy of the robot's arm, such a compliant coupling element can compensate for minor relative mispositioning or misalignment between the handling tool and the element to be handled by the robot.

Document US 2017/0045106 discloses a compliant coupling element for coupling a tool to a robot, for applications such as applying a label to a workpiece. Such compliant coupling element is however not adapted to be used for applications in a metal casting installation. The metallurgic industry is indeed characterized by the heavy weight and relatively large size of the elements to be handled by the robot, and also by the high deformation of such elements due to the high mechanical stress and high temperatures usually required by metal forming processes. The compliant coupling element from this prior art document is not adapted to bear the high loads and the match the large size of the elements of a metallurgic casting facility.

In document US 2017/0045106, the coupling element comprises a base component, or robot coupling interface, to be attached to the robot arm, and a compliance component, or tool coupling interface, attached to to the base component. The compliance component may move, with respect to the base component, axially, transversally, rotationally and skew, to at least some degree, in response to mechanical force from an engaged load. When the load is disengaged, the compliance component returns to a reset position wherein the compliance component is spaced apart from, but parallel to, the base component.

The compliance of the coupling element is provided by a piston pushing against the base component and disposed in a chamber having a pneumatic port, and the compliance level can be changed by varying the pneumatic pressure in the chamber behind the piston. The piston returns the compliance component to its spaced-apart position in the reset position. Shoulder bolts, or anchor rods, affixed to the base component seat in corresponding conical surfaces of the compliance component, defining the transverse and rotational components of the reset position. In the reset position, the shoulder bolts are biased to seat within the conical surfaces by the piston, if present due to to a sufficient pressure in the pneumatic chamber, and also under spring bias. Springs are indeed inserted between the base component and and the compliance component so as to push the conical surfaces of the compliance component against the shoulder portion of the bolts fixed to the base component.

In this configuration, under a uniform compressive load applied to the compliance element, the springs and the pneumatic chamber are consequently disposed in parallel because the axial compliance of the coupling element requires simultaneously a compression of the springs and a retracted position of the piston in the pneumatic chamber. Under an non-uniform compressive load applied to the compliance element, the different springs can undergo a different level of compression such to allow a non-parallel positioning of the compliance component with respect to the base component. In this arrangement, the springs are consequently essential elements for ensuring the the return of the compliance component to its reset position under a non-uniform compressive load. Such springs are however prone to wear, especially in the harsh conditions of a metallurgic facility. Furthermore, the presence of such springs urging the conical surfaces of the compliant component against the shoulder portion of the bolt results in the absence of compliance of the coupling element under the application of a tensile stress. The shoulder portions of the bolts indeed prevent the compliant component from being moved away from the base component.

Document EP 2 500 150 discloses a compliant end of arm tool for a robot, that can be used by the robot for applications such as picking parts from a bin. The compliant end of arm comprises a compliance device sandwiched between a robot coupling interface and a tool coupling interface. In one embodiment, the compliance device can be a rubber tube or bladder with pressurized air. A tether such as an industrial fabric or cables can be used to contain the compliance device between the two coupling interfaces. The tether can also be used to control the compliance level in the compliant end of arm tool. In another embodiment according to this prior art document, the compliance device may be a spring or a compressible material. This apparently simplifies the construction of the end of arm tool but on the other hand this eliminates the possibility of dynamically changing the level of compliance. None of the compliant coupling elements disclosed in this prior art document are however equipped to withstand high shear stress. These coupling elements are consequently not adapted to metallurgic applications wherein the end of arm tool needs to be able to handle various elements with a heavy weight.

Document EP 0 621 087 discloses a casting installation comprising a robot, wherein the robot is adapted to hold a slide gate of a metallurgical vessel and to perform its replacement. The robot comprises a handling tool and a coupling plate corresponding to an interface between the handling tool and the body of the robot. The interface between the robot and the handling tool is a rigid coupling. Therefore, the robot needs a very high accuracy when operating the handling tool because there will be no tolerance in case of relative mispositioning or misalignment between the handling tool and the slide gate to be handled.

Document DE 10 2009 050216 also discloses a casting installation comprising a robot, wherein the robot is adapted to hold a slide gate of a metallurgical vessel. As the interface between the robot and the handling tool is a rigid coupling, once again the robot needs a very high accuracy when operating the handling tool because there will be no tolerance in case of relative mispositioning or misalignment between the handling tool and the slide gate to be handled.

BRIEF SUMMARY OF THE INVENTION

It is an object of the present invention to provide a metallurgic installation with a robot having a handling tool wherein, when the position of the handling tool must be finetuned beyond the accuracy of the robot's arm, there is a compensation mechanism for minor relative mispositioning or misalignment between the handling tool and the element to be handled by the robot.

The present invention is defined in the appended independent claims. Preferred embodiments are defined in the dependent claims. In particular, the invention concerns a metallurgic casting installation comprising a robot, wherein said robot comprises a handling tool coupled to an arm of the robot by a coupling element, said coupling element comprising,
  a tool interface (2) rigidly coupled to the handling tool (21) and
  a robot interface (1) rigidly coupled to the arm of the robot,
  wherein,
  a) the compliance of the coupling element (29) can be controlled such that upon application of a load onto the tool interface (2), the tool interface (2) can be moved relative to the robot interface (1), by translation along and/or rotation about one or more of a first, second and third orthogonal spatial axes X1, X2, X3, and wherein
  b) the coupling element (29) is resilient in that upon release of the load, the tool interface (2) returns to a reset position relative to the robot interface (1) corresponding to a reset distance Dr separating the tool interface (2) and the robot interface (1),
  c) the coupling element (29) comprises at least one anchor rod (3) extending along a longitudinal axis Z1, wherein:
    i. the anchor rod (3) comprises a fixed end rigidly fixed to a first interface consisting of the robot interface (1) or the tool interface (2), the first interface defining a plane (X2, X3), transverse to the longitudinal axis Z1 of the rod;
    ii. the anchor rod (3) comprises an anchoring end portion (31) inserted in a passage (4) of a second interface consisting of the other of the robot interface (1) and the tool interface (2), the anchor rod (3) and the passage (4) being free to move in translation with respect to one another, such as to move the tool interface (2) away from and towards the robot interface (1) at least along the first axis X1;
    iii. the passage (4) comprises an abutting portion (41), with a diameter smaller than the diameter of the anchoring end portion (31), for abutting against the anchoring end portion (31) to limit the distance the tool interface (2) can be moved away from the robot interface (1) to a maximal distance D1;
    iv. the coupling element (29) comprises a compliant element (5) with an adjustable compliance level, said compliant element being located between said robot interface (1) and said tool interface (2) and coupled to at least one of said robot interface (1) and said tool interface (2);
  d) the compliant element of the coupling element is a closed inflatable chamber (5) with a deformable wall, wherein the closed inflatable chamber (5) can be inflated to a variable pressure up to a pressure wherein the distance between said tool interface (2) and said robot interface (1) is equal to the maximal distance D1.

In an advantageous embodiment, the compliant element is configured such that the reset position of the tool interface relative to the robot interface is adjustable along the first axis X1, wherein the reset position is adjustable in a range of positions corresponding to a distance between the robot interface and the tool interface lower than or equal to the maximal distance D1.

In an advantageous embodiment, the compliant element of the coupling element is configured to provide a compliance in both directions of the first axis X1 when the reset position is adjusted at an intermediate position corresponding to a distance between the robot interface and the tool interface lower than the maximal distance D1.

In an advantageous embodiment, the closed inflatable chamber is fixed to said robot interface and to said tool interface.

In an advantageous embodiment, the coupling element comprises a plurality of anchor rods, said anchor rods being distributed around the compliant element.

In an advantageous embodiment, the anchor rod and the passage are configured such that the passage of the second interface is free to move in translation relative to the anchor rod fixed to the first interface along the second axis X2, when the tool interface is at an intermediate reset position defined by a distance smaller than D1.

In an advantageous embodiment, the anchor rod and the passage are configured such that the passage of the second interface is free to move in translation relative to the anchor rod fixed to the first interface along the third axis X3, when the tool interface is at an intermediate reset position defined by a distance smaller than D1.

In an advantageous embodiment, the anchor rod and the passage are configured such that the passage of the second interface is free to rotate relative to the anchor rod fixed to the first interface about the first axis X1 when the tool interface is at an intermediate reset position defined by a distance smaller than D1.

In an advantageous embodiment, the anchor rod and the passage are configured such that the passage of the second interface is free to rotate relative to the anchor rod fixed to the first interface about the second axis X2 when the tool interface is at an intermediate reset position defined by a distance smaller than D1.

In an advantageous embodiment, the anchor rod and the passage are configured such that the passage of the second interface is free to rotate relative to the anchor rod fixed to the first interface about the third axis X3 when the tool interface is at an intermediate reset position defined by a distance smaller than D1.

In an advantageous embodiment, the longitudinal axis Z1 of the anchor rod is parallel to the first axis X1, and the anchoring portion of said at least one anchor rod and the abutting portion in said passage is configured as a self-centering mechanism, such that the longitudinal axis Z1 of the rod is automatically aligned on a longitudinal axis Z2 of the passage, when the tool interface is translated with respect to the robot interface along the first axis X1 up to the maximal distance D1.

BRIEF DESCRIPTION OF THE SEVERAL VIEWS OF THE DRAWINGS

These and further aspects of the invention will be explained in greater detail by way of example and with reference to the accompanying drawings in which.

The figures are not drawn to scale.

DETAILED DESCRIPTION OF THE INVENTION

Figure 1A:
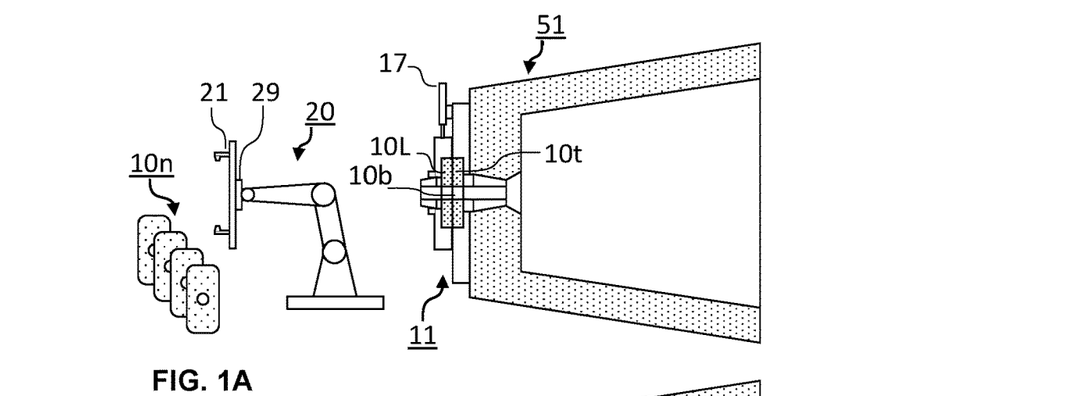
FIG. 1 shows various steps for changing sliding gate valve plates in a metallurgic vessel by a robot in a metallurgic casting installation according to the invention.
Figure 1B:
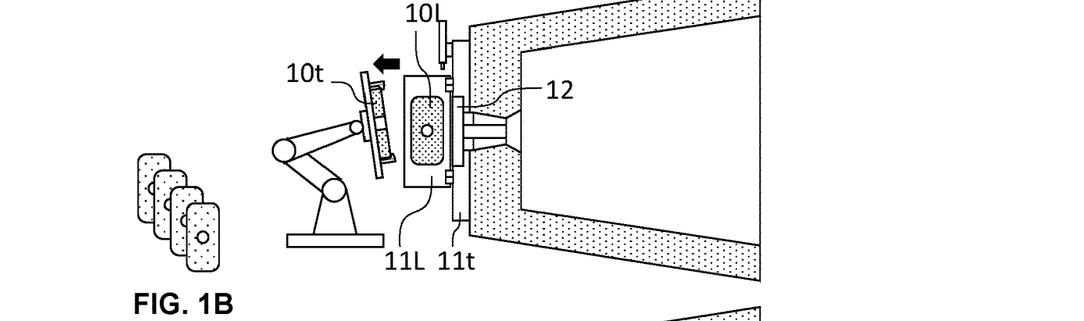

FIG. 1(a) shows a metallurgic vessel 51 such as a tundish or a ladle lying on its side in a workshop of a metallurgic casting facility according to the invention where it is checked for worn elements and for refurbishing. The metallurgic vessel comprises a slide gate valve exposed vertically for changing sliding gate valve plates 10t, 10L which are worn and replacing them with new sliding gate valve plates 10n stored in an appropriate place, ready for use. As represented in FIGS. 1(a)-(d), a metallurgic casting installation according to the present invention can comprise a robot 20 for fixing or removing a sliding gate valve plate to or from a sliding gate valve. The robot 20 comprises a handling tool 21 for gripping and manipulating the sliding gate valve plate.

Figure 1C:
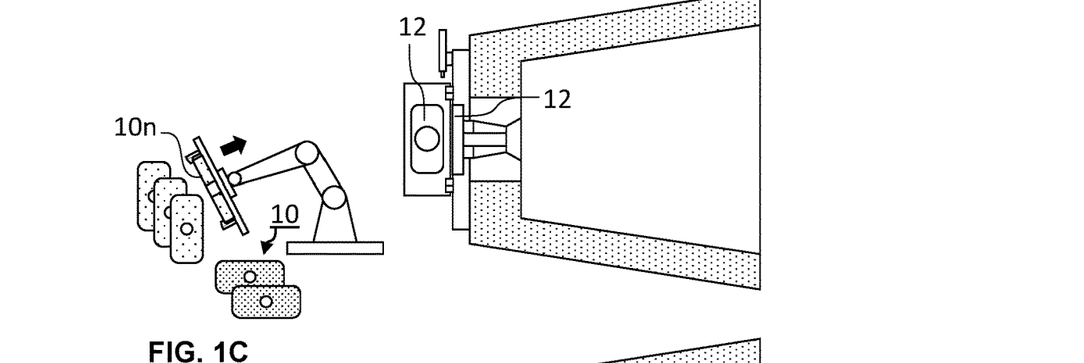
Figure 1D:
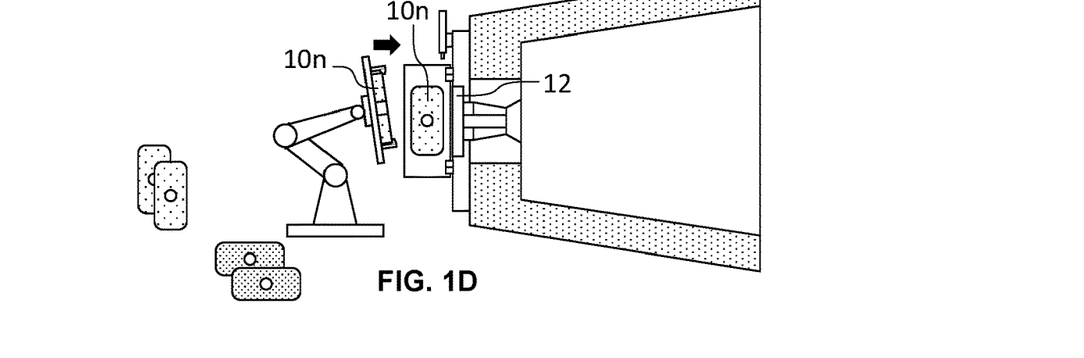

As shown in FIGS. 1(a)&(b), when a metallurgic vessel 51 is brought to a workshop, it can be laid on its side to expose the sliding gate valve. The sliding gate valve is opened by the robot by rotation about hinges of the bottom plate support frame 11L relative to the top plate support frame 11t. The robot 20 removes the sliding gate valve plates 10t, 10L from their respective plate support frames 11t, 11L and stores them for repair or for disposal (cf. FIG. 1(c)). As shown in FIGS. 1(c)&(d), the robot takes new sliding gate valve plates 10n which were stored for use and couples them to the receiving cradles 12 of the corresponding plate support frames 11t, 11L. The bottom plate support frame 11L can be closed to bring the sliding surfaces 10s of the top and bottom sliding gate valve plates 10t, 10L in sliding contact with one another (cf. FIG. 1(a), but with new sliding gate valve plates).

The robot 20 used in the present invention can be any robot available on the market comprising sufficient degrees of freedom, such as for example, five to seven degrees of freedom, for performing tasks in a metallurgic casting installation. In the application depicted in FIG. 1(a)-(d) for changing sliding gate valve plates in a metallurgic vessel, the robot 20 is configured for performing the operations of collecting a sliding gate valve plate, moving it between a storage position and a sliding gate valve, and for positioning the sliding gate valve plate into a corresponding receiving cradle 12.

One essential feature of the present invention is the handling tool 21 provided at the end of an arm of the robot 20. The handling tool 21 is thus an end of arm tool used by the robot 20 for generating a mechanical interaction with elements of the metallurgic casting installation. In the application shown in FIG. 1(a)-(d), the handling tool 21 is advantageously equipped with gripping clamps for gripping the sliding gate valve plate and configured for, collecting a new unit 10n of the sliding gate valve plates and coupling and locking it to the corresponding plate support frame 11, and/or unlocking and removing a spent unit 10 of the sliding gate valve plate from the corresponding plate support frame 11, and safely transporting a sliding gate valve plate between a storage position and the plate support frame 11.

Besides the example of configuration depicted in FIG. 1(a)-(d), the robot 20 and handling tool 21 of the present invention can be configured for performing any other useful tasks in a metallurgic casting installation. Other examples of applications wherein the robot 20 and handling tool 21 according the present invention can be used include: oxygen lancing on the continuous casting platform and/or in the ladle makeup area, installation or removal of the hydraulic or pneumatic cylinder of a valve gate, installation of a refractory element such as for instance a collector nozzle, upper nozzle, purge plug, installation or removal of any mechanical part of the regulation, devices, handling of monitoring devices such as probes, sampling units, level, thickness or temperature measurement units, . . .

Because each new metallurgic vessel 51 or any other element in the metallurgic installation to be handled by the robot 20 is not necessarily positioned at exactly the same position, it is not practical to configure the robot to repeat exactly the same movements with each new metallurgic vessel 51. It is therefore preferred that the robot be provided with an electromagnetic wave recognition system, such as an optical camera system with recognition of elements, infrared (e.g., Lidar), radar, etc. These systems may not have the accuracy required for the operations to be performed by the robot and, in case of an optical recognition system, fumes and vapours may disrupt visibility and the accuracy of the movements.

Consequently, in the embodiment illustrated in FIG. 2, the handling tool 21 may comprise guiding pins 23. Such guiding pins 23 protrude beyond a plane comprising the sliding surface 10s when a sliding gate valve plate 10n is gripped. The plate support frame 11 comprises funnel shaped cavities 13 for receiving the guiding pins and guiding the sliding gate valve plate in alignment with the receiving cradle 12. As shown in FIG. 2, the guiding pins allow a re-alignment of the handling tool 21 holding a sliding gate valve plate relative to the plate support frame 11. This is however only made possible if the "wrist" between the arm of the robot 20 and the handling tool 21 is flexible.

Such flexibility or compliance of the coupling between the arm of the robot 20 and the handling tool 21 was found to be very advantageous in many robotized applications within a metallurgic casting installation. It was also observed that for many metallurgic applications, it is important to provide a coupling element with an adjustable compliance level. This is because a relatively higher compliance level will be required during specific manipulations of the robot, typically when the handling tool 21 of the robot 20 needs to be coupled to an element from the metallurgic facility. Other maneuvers, such as the safe transportation of the element from one place to another by the robot, require on the other hand a relatively stiff coupling between the robot's arm and the end of arm tool.

To this end, another essential feature of the present invention is the coupling element 29 coupling the arm of the robot 20 to the handling tool 21. The coupling element 29 comprises a tool interface 2 rigidly coupled to the handling tool 21 and a robot interface 1 rigidly coupled to the arm of the robot 20. The compliance of the coupling element 29 can be controlled such that upon application of a load onto the tool interface 2, the tool interface 2 can be moved relative to the robot interface 1, by translation along and/or rotation about one or more of a first, second and third orthogonal spatial axes X1, X2, X3.

The coupling element 29 is also resilient in that upon release of the load, the tool interface 2 returns to a reset position relative to the robot interface 1 corresponding to a reset distance Dr separating the tool interface 2 and the robot interface 1. Upon release of the load, the tool interface 2 consequently returns to the same position relative to the robot interface 1 as it was before the application of the load. The distance Dr is a distance characterizing the spacing between the tool interface 2 and the robot interface 1 in this reset position and corresponds to the distance between two points of a couple of reference points, with one reference point being taken on the robot interface 1 and the other one being taken on the tool interface 2. The two reference points must be chosen such that they belong to a same axis parallel to the spatial axis X1, with one of the two interfaces consisting of the robot interface 1 and the tool interface 2 defining a plane (X2, X3).

Figure 3:
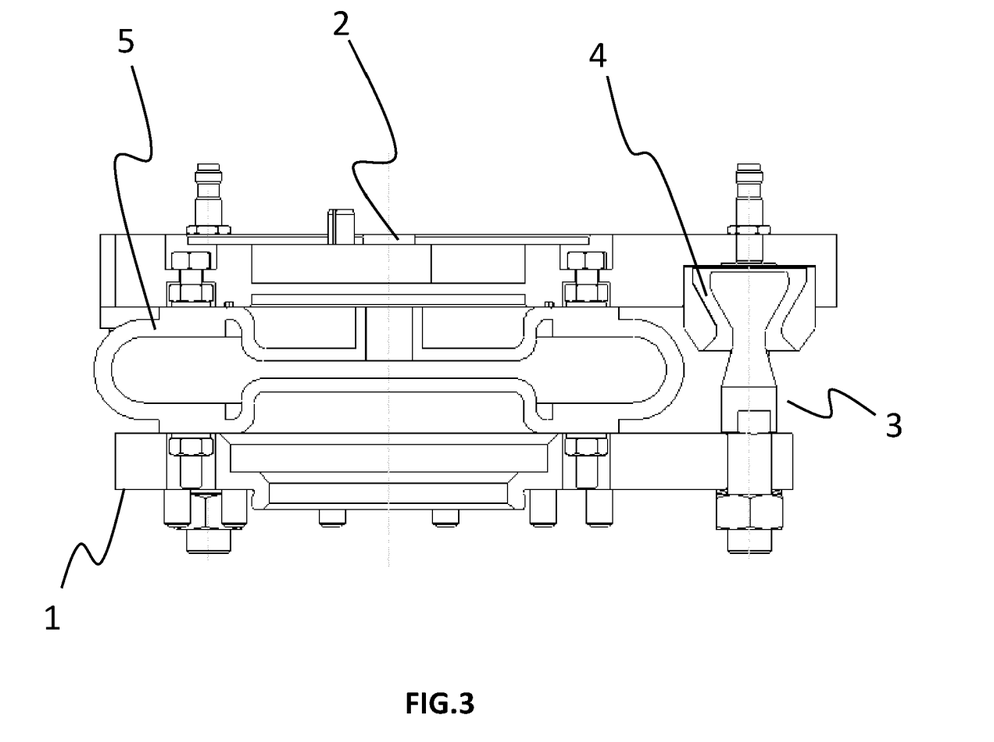
FIG. 3 is a cross-sectional view of an example of a coupling element between a handling tool and a robot's arm in a metallurgic installation according to the invention, when the tool interface is at an intermediate reset position defined by a distance smaller than the maximal distance D1.
Figure 4:
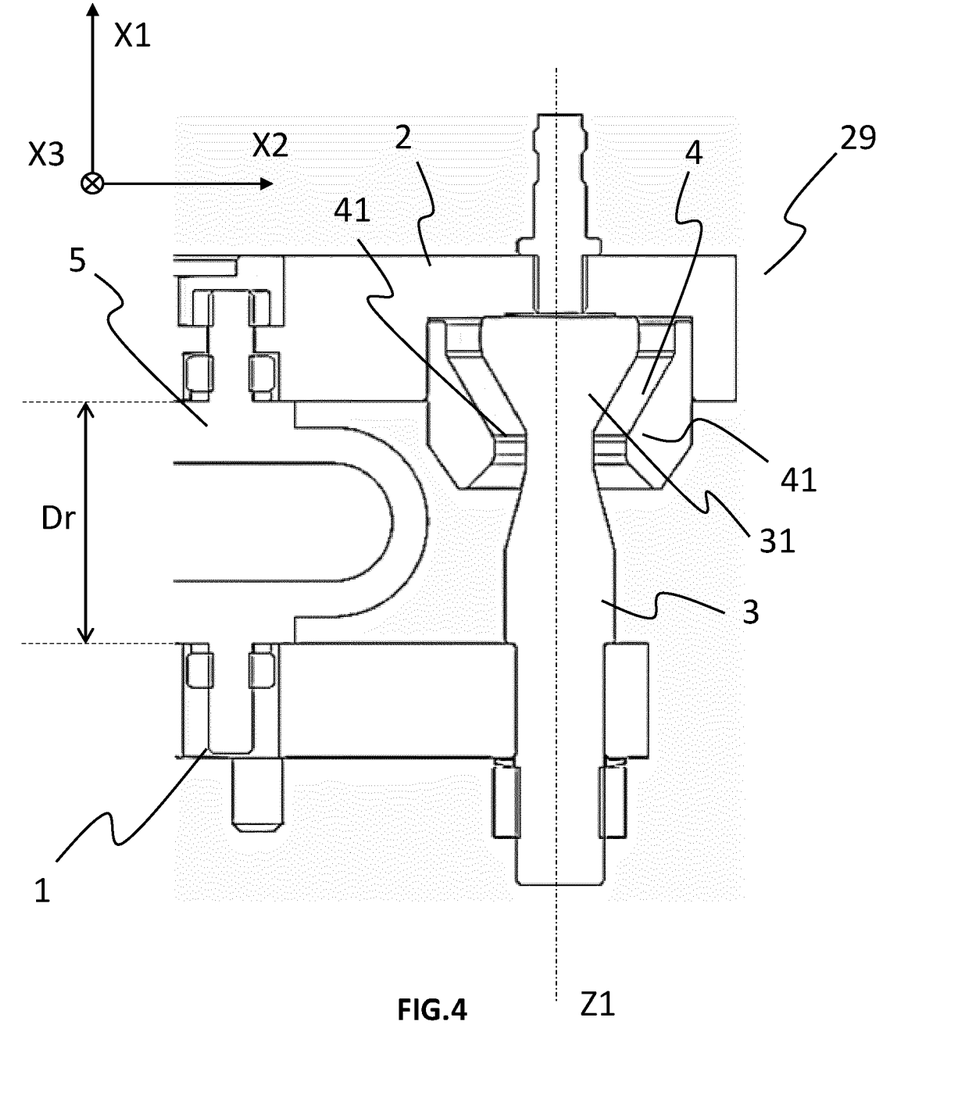
FIG. 4 is a cross-sectional view of the anchor rod and passage in the coupling element of FIG. 3, when the tool interface is at an intermediate reset position defined by a distance smaller than the maximal distance D1.
Figure 5:
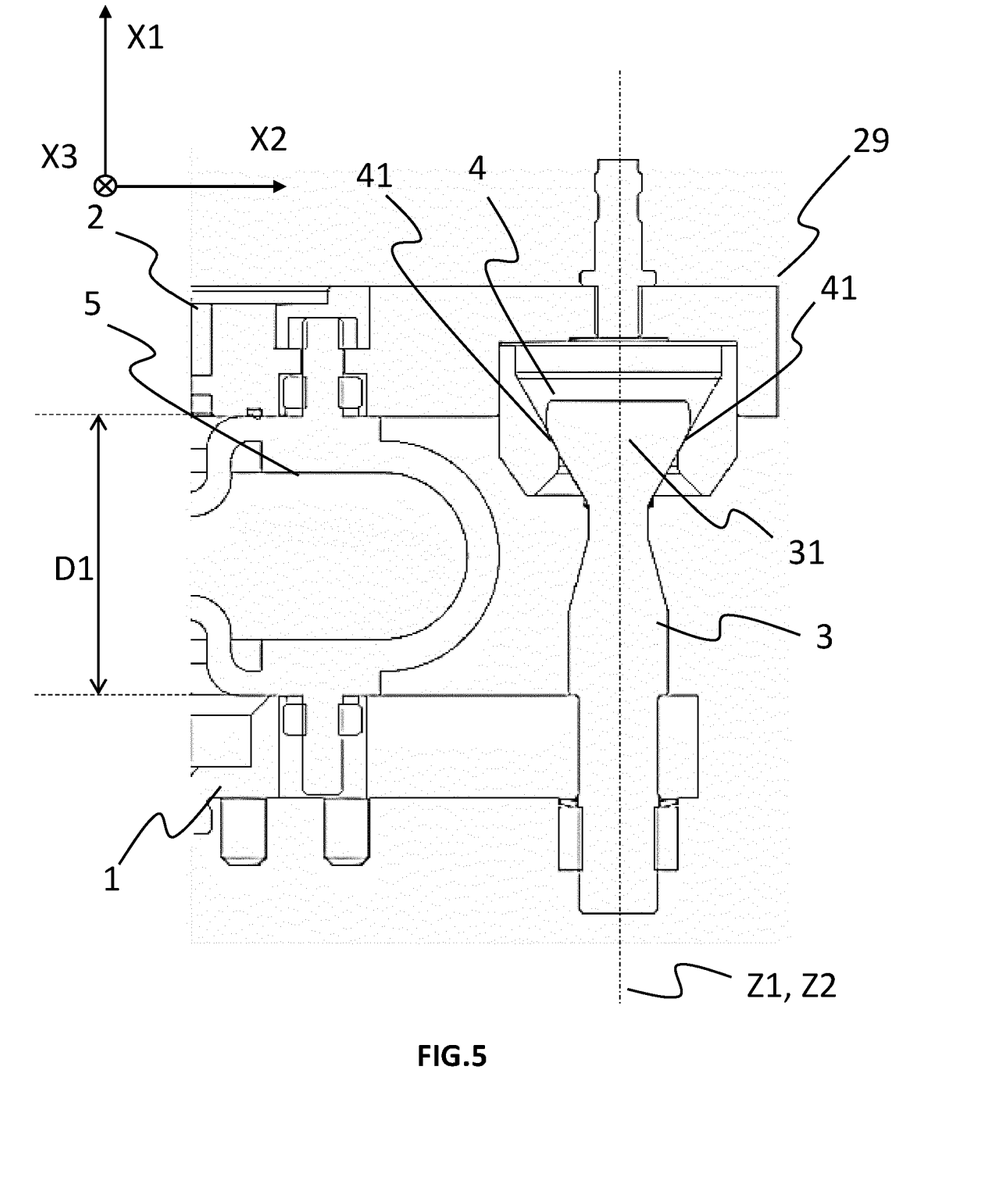
FIG. 5 is a cross-sectional view of the anchor rod and passage in the coupling element of FIG. 3, when the tool interface is at a reset position defined by the maximal distance D1.

In the embodiment of FIGS. 3-5, the coupling element 29 comprises an anchor rod 3 rigidly fixed to the robot interface 1. The robot interface 1 defines the plane (X2, X3) and the anchor rod 3 has a longitudinal axis Z1 transverse, advantageously perpendicular, to this plane (X2, X3). The anchor rod 3 comprises an anchoring end portion 31 inserted in a passage 4 of the tool interface 2. As represented in FIG. 3, the anchor rod 3 and the passage 4 are free to move in translation with respect to one another, such as to move the tool interface 2 away from and towards the robot interface 1 along the first axis X1. The passage 4 comprises an abutting portion 41, with a diameter smaller than the diameter of the anchoring end portion 31, for abutting against the anchoring end portion 31 to limit the distance the tool interface 2 can be moved away from the robot interface 1 to a maximal distance D1, as represented in FIG. 5.

In another embodiment, the robot interface 1 and the tool interface 2 are arranged in the reverse configuration. In such reverse configuration, the anchor rod 3 is rigidly fixed to the tool interface 2 and the anchoring end portion 31 is inserted in a passage 4 of the robot interface 1. In both the embodiment of FIGS. 3-5 and the reverse configuration, it was found that the anchor rod 3 inserted in the passage 4 is particularly advantageous for metallurgic applications. Such anchor rod 3 inserted in the passage 4 indeed limits the amplitude of the compliant rotation about axes X2 and X3 of the tool interface 2 relative to the robot interface 1. Furthermore, when the compliance is adjusted such that the coupling element becomes stiff, such anchor rod 3 further increases the bending stiffness of the coupling element 29. This mechanical arrangement involving the anchor rod 3 and passage 4 is consequently very advantageous for metallurgic applications, wherein high loads are usually applied on the coupling element 29, both when its compliance is adjusted at a low and high level. In the embodiment of FIGS. 2-5, the compliant element 29 comprises a plurality of anchor rods 3 distributed around a compliant element. In an alternative embodiment, a single anchor rod 3 can be provided, and the compliant element can be located around or adjacent the single anchor rod 3.

The coupling element 29 comprises a compliant element with an adjustable compliance level. The compliant element is located between the robot interface 1 and the tool interface 2 and is coupled to at least one of these two interfaces. The compliant element must be configured such that it can be in contact with both the robot interface 1 and the tool interface 2, at least for some levels of compliance. In this configuration, a sufficient compressive load applied onto the tool interface 2 will generate a deformation of the compliant element, which consequently allows a relative motion of the tool interface 2 with respect to the robot interface 1. Upon release of the load, the compliant element returns to its initial configuration such that the tool interface 2 returns to its reset position relative to the robot interface 1. The compliant element comprises advantageously a deformable chamber connected to a pneumatic or a hydraulic system for varying the pressure inside the deformable chamber such to adjust the compliance level. A deformable chamber can be a chamber made of a single deformable wall, such as an inflatable chamber, or a chamber with a plurality of rigid walls wherein one wall can be moved in translation relative to the others, such as a parallelepipedal pneumatic or hydraulic chamber wherein one wall is slidably mounted on the others. The compliant element can also comprise other elements such as springs located between the robot interface 1 and the tool interface 2. In this configuration, the compliant element advantageously also comprises mechanical means to stretch or compress the springs, and the corresponding distance between the tool interface 2 and the robot interface 1, such that the compliance level provided by the springs can be adjusted.

In the embodiments of FIGS. 3-5, the compliant element is a closed inflatable chamber 5 with a deformable wall. The closed inflatable chamber 5 is configured to be inflatable to a variable pressure, advantageously by a pneumatic system, at least up to a pressure wherein the distance between the tool interface 2 and the robot interface 1 is equal to the maximal distance D1. The compliance level of the coupling element 29 is thus changed by varying the pressure in the inflatable chamber 5. The lower the pressure, the higher compliance. The pressure in the closed inflatable chamber 5 can be provided by a pneumatic or hydraulic system operatively connected to the closed inflatable chamber 5. The closed inflatable chamber 5 is advantageously fixed to at least one of the robot interface 1 and the tool interface 2, and preferably fixed to both of them. The closed inflatable chamber 5 is a simple but efficient and cost effective mechanical implementation of the compliant element. Above all, the maintenance operations for such an inflatable chamber 5 are simple. Furthermore, as it can be inflated to a large range of pressure, it offers a large range of compliance values for the coupling element 29. In an advantageous embodiment, the closed chamber 5 can be operated in three pressure level modes: high-pressure, low-pressure and zero pressure. As discussed supra, on the other hand, the presence of the anchor rod 3 is advantageous for bearing the high loads typically observed in metallurgical applications.

Figure 2A:
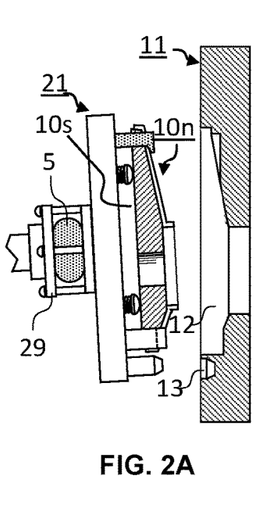
FIG. 2 shows various steps for coupling a sliding gate valve plate to a plate support frame by a robot in a metallurgic casting installation according to the invention, with an enlarged view of the coupling element and handling tool.
Figure 2B:
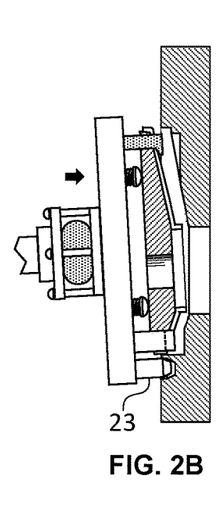
Figure 2C:
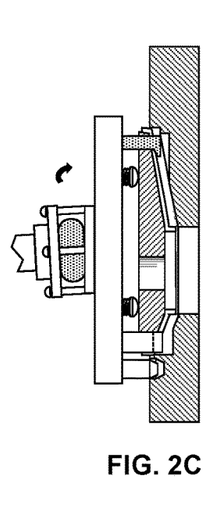
Figure 2D:
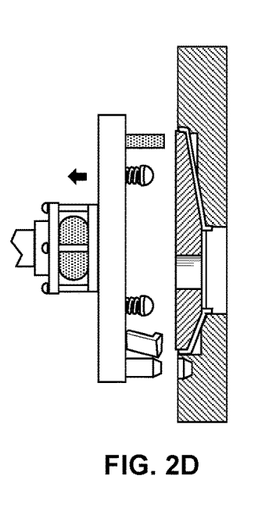

When a stiff coupling between the robot 20 and the handling tool 21 is required, the pressure in the inflatable chamber 5 is raised up to a pressure wherein the distance between the tool interface 2 and the robot interface 1 is equal to the maximal distance D1. In this configuration, the coupling between the robot 20 and the handling tool 21 is perfectly stiff in traction because the distance Dr between the tool interface 2 and the robot interface 1 is already at the maximal possible distance D1. In compression, the level of stiffness, inversely proportional to the level of compliance, depends directly on the pressure applied in the inflatable chamber 5. In the embodiment of FIG. 2, the compliance of the coupling element 29 is adjusted such that it provides a compliant coupling when the guiding pins 23 contact the corresponding funnel shaped cavities 13, as represented in FIG. 2(c). Before and after the contact between the guiding pens 23 and the funnel shaped cavities 13, the compliance of the coupling element 29 is advantageously adjusted such that it provides a stiff coupling, as depicted in FIGS. 2(a), 2(b), and 2(d).

As represented in FIG. 2(c), the deformation of the closed inflatable chamber 5 can be such that the tool interface 2 becomes non-parallel to the robot interface 1. This property of the closed inflatable chamber 5 with a deformable wall is advantageous when the coupling element 29 needs to comply under asymmetric load. In order to achieve this non-parallelism of the tool and robot interfaces, it is also necessary to provide the anchoring end portion 31 with a shape and dimensions such that it can be moved relative to passage 4 along at least one of axes X2 and X3. In the embodiment of FIGS. 3-5, when the reset position is defined by a distance smaller than D1, there is a gap along axes X2 and X3 between the outer surface of the anchoring end portion 31 and the inner surface of the passage 4. The passage 4 can therefore be moved relative to the anchor rod 3 along axes X2 and X3 until the inner surface of the passage 4 contacts the outer surface of the anchoring end portion 31. The gap between the outer surface of the anchoring end portion 31 and the inner surface of the passage 4 along axes X2 and X3 also allows a rotation to some amplitude of the passage 4 relative to the anchor rod 3 about axes X1, X2 and X3. The rotation about axes X2 and X3 is requested when the coupling element 29 needs to be compliant in flexion while the rotation about axis X1 is requested for a compliance in torsion.

When the pressure is varied in the closed inflatable chamber 5, its volume changes together with its level of compliance. This property of the closed inflatable chamber 5 is advantageous in combination with the mechanical arrangement made of anchor rod 3 in the passage 4. By changing the volume of the closed inflatable chamber 5, the coupling element 29 can indeed be set in a configuration wherein the reset distance Dr between the robot interface 1 and the tool interface 2 is lower the maximal distance D1, such as represented in FIGS. 3 and 4. This configuration is advantageous because starting from this reset position of the tool interface 2 relative to the robot interface 1, the tool interface 2 can be moved in both directions of the axis X1. Such configuration consequently provides a compliance both in traction and in compression of the coupling element 29. Alternatively, as already discussed supra, the coupling element 29 can be set in a configuration wherein the reset distance Dr between the robot interface 1 and the tool interface 2 is equal to the maximal distance D1, such as represented in FIG. 5. In this configuration, the coupling provided by the coupling element 29 is perfectly stiff in traction, while in compression the stiffness is directly dependent on the pressure in the inflatable chamber 5. With a sufficient pressure in the inflatable chamber 5, the coupling element 29 can consequently become stiff both in traction and in compression. This property of adjustable reset position of the tool interface 2 and the potential compliance in both directions of axis X1 is a consequence of the presence of the closed inflatable chamber 5. However, in alternative embodiments, such property can still be obtained when the closed inflatable chamber 5 is replaced by a plurality of springs, with some working in traction and others working in compression in the reset position, coupled to both the robot interface 1 and the tool interface 2. Mechanical means to compress or stretch the springs and to couple or decouple the springs from at least one of the robot interface 1 and the tool interface 2 are then advantageously provided, for changing the reset distance and the compliance level of the coupling element 29.

In the embodiment of FIGS. 3-5, the anchoring end portion 31 has a conical shape and the abutting portion 41 of the passage 4 has corresponding conical surfaces. In this configuration, the anchoring portion 31 and the abutting portion 41 are configured as a self-centering mechanism. The longitudinal axis Z1 of the rod 3 is indeed automatically aligned on a longitudinal axis Z2 of the passage 4, when the tool interface 2 is translated with respect to the robot interface 1 along the first axis X1 up to the maximal distance D1. This self-centering mechanism allows a proper alignment of the tool interface 2 to the robot interface 1 when the compliance in the coupling element 29 is adjusted at a low level. In case of a stiff coupling between the handling tool 21 and the robot 20, it is indeed advantageous to ensure that the tool interface 2 is automatically located at a position relative to the robot interface 1 which is predefined and known by the robot.

Various features and characteristics of the invention are described in this specification and illustrated in the drawings to provide an overall understanding of the invention. It is understood that the various features and characteristics described in this specification and illustrated in the drawings can be combined in any operable manner regardless of whether such features and characteristics are expressly described or illustrated in combination in this specification. The Inventor and the Applicant expressly intend such combinations of features and characteristics to be included within the scope of this specification, and further intend the claiming of such combinations of features and characteristics to not add new matter to the application. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with the written description requirement under 35 U.S.C. § 112(a). The invention described in this specification can comprise, consist of, or consist essentially of the various features and characteristics described in this specification.

LIST OF REFERENCES 1. robot interface
2. tool interface
3. anchor rod
4. passage
5. compliant element: closed inflatable chamber
10. spent unit of the sliding gate valve plate
10t. sliding gate top plate
10L. sliding gate bottom plate
10n. new sliding gate valve plate
10s. sliding surfaces of the top and bottom sliding gate valve plates
11. plate support frame:
11L. bottom plate support frame
11t. top plate support frame
12. cradles
13. funnel shaped cavities
20. robot
21. handling tool
23. guiding pins
29. coupling element
31. anchoring end portion
41. abutting portion
51. metallurgic vessel

What is claimed is:

1. A metallurgic casting installation comprising a robot, wherein said robot comprises a handling tool coupled to an arm of the robot by a coupling element, said coupling element comprising,
   a tool interface rigidly coupled to the handling tool and a robot interface rigidly coupled to the arm of the robot,
   a) wherein the compliance of the coupling element can be controlled such that upon application of a load onto the tool interface, the tool interface can be moved relative to the robot interface, by translation along and/or rotation about one or more of a first, second and third orthogonal spatial axes X1, X2, X3,
   b) wherein the coupling element is resilient in that upon release of the load, the tool interface returns to a reset position relative to the robot interface corresponding to a reset distance Dr separating the tool interface and the robot interface,
   c) wherein the coupling element comprises at least one anchor rod extending along a longitudinal axis Z1,
      wherein the anchor rod comprises a fixed end rigidly fixed to a first interface consisting of the robot interface or the tool interface, the first interface defining a plane (X2, X3), transverse to the longitudinal axis Z1 of the rod;
      wherein the anchor rod comprises an anchoring end portion inserted in a passage of a second interface consisting of the other of the robot interface and the tool interface, the anchor rod and the passage being free to move in translation with respect to one another, such as to move the tool interface away from and towards the robot interface at least along the first axis X1;
      wherein the passage comprises an abutting portion, with a diameter smaller than the diameter of the anchoring end portion, for abutting against the anchoring end portion to limit the distance the tool interface can be moved away from the robot interface to a maximal distance D1; and
      wherein the coupling element comprises a compliant element with an adjustable compliance level, said compliant element being located between said robot interface and said tool interface, said compliant element configured to be in contact with both said robot interface and said tool interface, and said compliant element coupled to at least one of said robot interface and said tool interface and;
   d) wherein the compliant element of the coupling element is a closed inflatable chamber with a deformable wall, wherein the closed inflatable chamber can be inflated to a variable pressure up to a pressure wherein the distance between said tool interface and said robot interface is equal to the maximal distance D1.

2. The metallurgic casting installation according to claim 1 wherein the compliant element (5) is configured such that the reset position of the tool interface (2) relative to the robot interface (1) is adjustable along the first axis X1, wherein the reset position is adjustable in a range of positions corresponding to a distance between the robot interface (1) and the tool interface (2) lower than or equal to the maximal distance D1.

3. The metallurgic casting installation according to claim 2 wherein the compliant element of the coupling element is configured to provide a compliance in both directions of the first axis X1 when the reset position is adjusted at an intermediate position corresponding to a distance between the robot interface and the tool interface lower than the maximal distance D1.

4. The metallurgic casting installation according to claim 1, wherein the coupling element comprises a plurality of anchor rods, said anchor rods being distributed around the compliant element.

5. The metallurgic casting installation according to claim 1, wherein the anchor rod and the passage are configured such that the passage of the second interface is free to move in translation relative to the anchor rod fixed to the first interface along the second axis X2, when the tool interface is at an intermediate reset position defined by a distance smaller than D1.

6. The metallurgic casting installation according to claim 1 wherein the anchor rod and the passage are configured such that the passage of the second interface is free to move in translation relative to the anchor rod fixed to the first interface along the third axis X3, when the tool interface is at an intermediate reset position defined by a distance smaller than D1.

7. The metallurgic casting installation according to claim 1 wherein the anchor rod and the passage are configured such that the passage of the second interface is free to rotate relative to the anchor rod fixed to the first interface about the first axis X1 when the tool interface is at an intermediate reset position defined by a distance smaller than D1.

8. The metallurgic casting installation according to claim 1 wherein the anchor rod and the passage are configured such that the passage of the second interface is free to rotate relative to the anchor rod fixed to the first interface about the second axis X2 when the tool interface is at an intermediate reset position defined by a distance smaller than D1.

9. The metallurgic casting installation according to claim 1 wherein the anchor rod and the passage are configured such that the passage of the second interface is free to rotate relative to the anchor rod fixed to the first interface about the third axis X3 when the tool interface is at an intermediate reset position defined by a distance smaller than D1.

10. The metallurgic casting installation according to claim 1 wherein the longitudinal axis Z1 of the anchor rod is parallel to the first axis X1, the anchoring portion of said at least one anchor rod and the abutting portion in said passage being configured as a self-centering mechanism, such that the longitudinal axis Z1 of the rod is automatically aligned on a longitudinal axis Z2 of the passage, when the tool interface is translated with respect to the robot interface along the first axis X1 up to the maximal distance D1.

11. A metallurgic casting installation comprising a robot, wherein said robot comprises a handling tool coupled to an arm of the robot by a coupling element, said coupling element comprising,
   a tool interface rigidly coupled to the handling tool and a robot interface rigidly coupled to the arm of the robot,
   a) wherein the compliance of the coupling element can be controlled such that upon application of a load onto the tool interface, the tool interface can be moved relative to the robot interface, by translation along and/or rotation about one or more of a first, second and third orthogonal spatial axes X1, X2, X3,
   b) wherein the coupling element is resilient in that upon release of the load, the tool interface returns to a reset position relative to the robot interface corresponding to a reset distance Dr separating the tool interface and the robot interface,
   c) wherein the coupling element comprises at least one anchor rod extending along a longitudinal axis Z1,
      wherein the anchor rod comprises a fixed end rigidly fixed to a first interface consisting of the robot interface or the tool interface, the first interface defining a plane (X2, X3), transverse to the longitudinal axis Z1 of the rod;
      wherein the anchor rod comprises an anchoring end portion inserted in a passage of a second interface consisting of the other of the robot interface and the tool interface, the anchor rod and the passage being free to move in translation with respect to one another, such as to move the tool interface away from and towards the robot interface at least along the first axis X1;
      wherein the passage comprises an abutting portion, with a diameter smaller than the diameter of the anchoring end portion, for abutting against the anchoring end portion to limit the distance the tool interface can be moved away from the robot interface to a maximal distance D1; and
      wherein the coupling element comprises a compliant element with an adjustable compliance level, said compliant element being located between said robot interface and said tool interface and coupled to at least one of said robot interface and said tool interface and;
   d) wherein the compliant element of the coupling element is a closed inflatable chamber with a deformable wall, wherein the closed inflatable chamber can be inflated to a variable pressure up to a pressure wherein the distance between said tool interface and said robot interface is equal to the maximal distance D1;
   wherein the closed inflatable chamber is fixed to said robot interface and to said tool interface.

* * * * *